(12) United States Patent
Rose

(10) Patent No.: US 8,162,541 B2
(45) Date of Patent: Apr. 24, 2012

(54) TWO-TERMINAL TEMPERATURE SENSOR WITH ELECTRICALLY ISOLATED HOUSING

(76) Inventor: Vincent H. Rose, Powell, WY (US); Roxanne P. Ostlund, legal representative, Cheyenne, WY (US)

( * ) Notice: Subject to any disclaimer, the term of this patent is extended or adjusted under 35 U.S.C. 154(b) by 437 days.

(21) Appl. No.: 12/419,071

(22) Filed: Apr. 6, 2009

(65) Prior Publication Data
US 2010/0254428 A1   Oct. 7, 2010

(51) Int. Cl.
*G01K 7/00* (2006.01)
*G01K 7/16* (2006.01)

(52) U.S. Cl. ............ 374/183; 338/28; 338/30; 324/724; 374/208; 374/E7.028

(58) Field of Classification Search .......... 374/183–185, 374/140, 144, 208, E7.028; 338/28, 30; 324/724
See application file for complete search history.

(56) References Cited

U.S. PATENT DOCUMENTS

| | | | |
|---|---|---|---|
| 2,211,168 A * | 8/1940 | Schwartzwalder et al. ..... | 338/30 |
| RE21,716 E * | 2/1941 | Bacon .............................. | 338/30 |
| 3,890,588 A * | 6/1975 | Kanaya et al. ................... | 338/28 |
| 4,002,924 A * | 1/1977 | Busch ........................... | 307/117 |
| 4,143,347 A * | 3/1979 | Ichida ............................ | 338/28 |
| 4,241,289 A * | 12/1980 | Bowling ................... | 219/448.14 |
| 4,638,291 A * | 1/1987 | Puscasu ........................ | 340/450 |
| 4,866,410 A * | 9/1989 | Deppe et al. .................... | 338/28 |
| 4,887,062 A * | 12/1989 | Bletz ............................. | 337/299 |
| 4,959,633 A | 9/1990 | Kiraly et al. | |
| 5,176,451 A * | 1/1993 | Sasada et al. .................. | 374/179 |
| 5,302,934 A * | 4/1994 | Hart et al. .................... | 338/22 R |
| 5,481,240 A | 1/1996 | Fukaya et al. | |
| 6,305,841 B1 | 10/2001 | Fukaya et al. | |
| 6,588,931 B2 | 7/2003 | Betzner et al. | |
| 7,312,690 B1 | 12/2007 | Geer | |
| 2002/0172259 A1 * | 11/2002 | Bach ............................ | 374/208 |

FOREIGN PATENT DOCUMENTS

| | | | | |
|---|---|---|---|---|
| EP | 0 800 068 A1 * | 10/1997 | ............. | 374/E7.028 |
| GB | 2 045 529 A * | 2/1980 | ............. | 374/E7.028 |

OTHER PUBLICATIONS

Author Unknown, CAD drawing from Pricol Limited dated Sep. 12, 2005.

* cited by examiner

*Primary Examiner* — Randy W Gibson
(74) *Attorney, Agent, or Firm* — Dorsey & Whitney LLP

(57) ABSTRACT

A two-terminal temperature sensor connects a first end of thermistor or other thermometer device to a first electrical terminal via an inner compression coil. A second electrical terminal is connected to a second end of the thermistor via an outer compression coil and a formed conductor. The inner compression coil and thermistor are positioned within the formed conductor. The inner compression coil and thermistor are prevented from contact with the formed conductor by an inner insulating tube. The first and second electrical contacts are mounted in a molded terminal assembly that insulates the electrical contacts from one another. The entire assembly is housed within a housing that is electrically isolated from the formed conductor and outer compression coil via an outer insulating tube and an insulating disk.

20 Claims, 5 Drawing Sheets

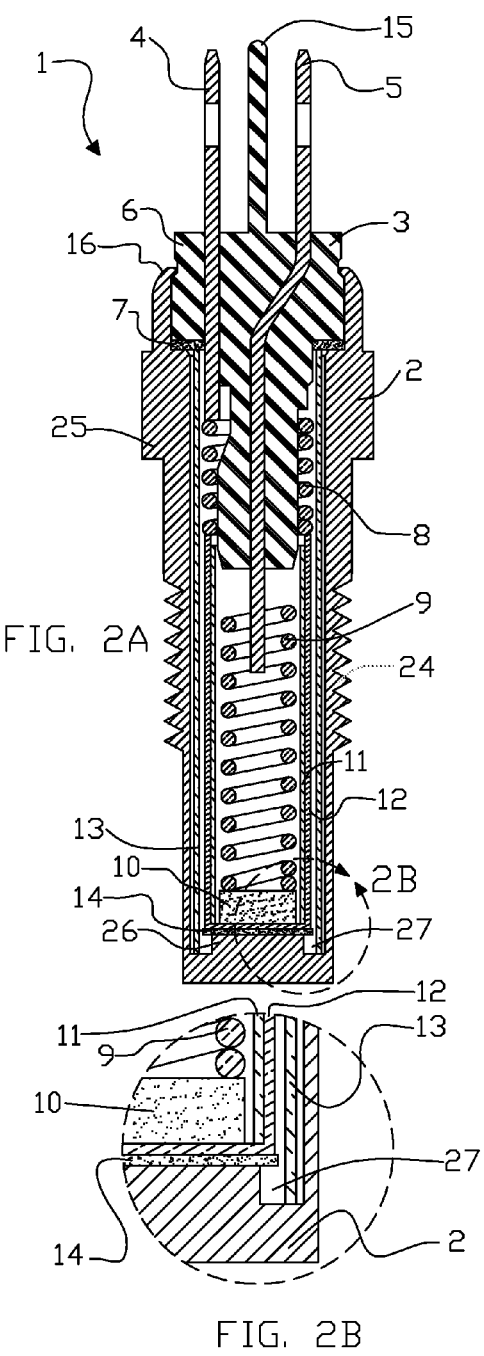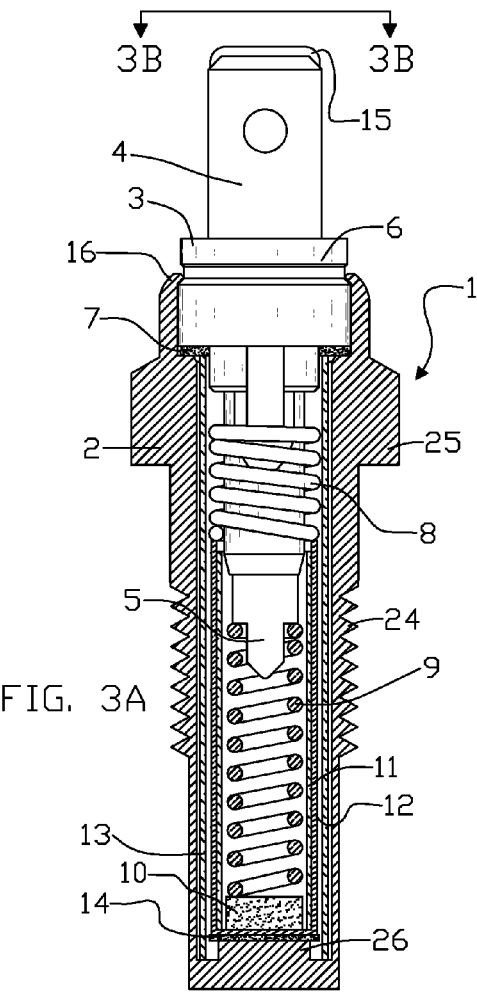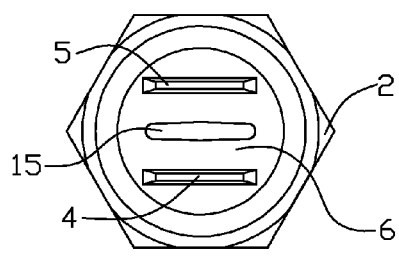

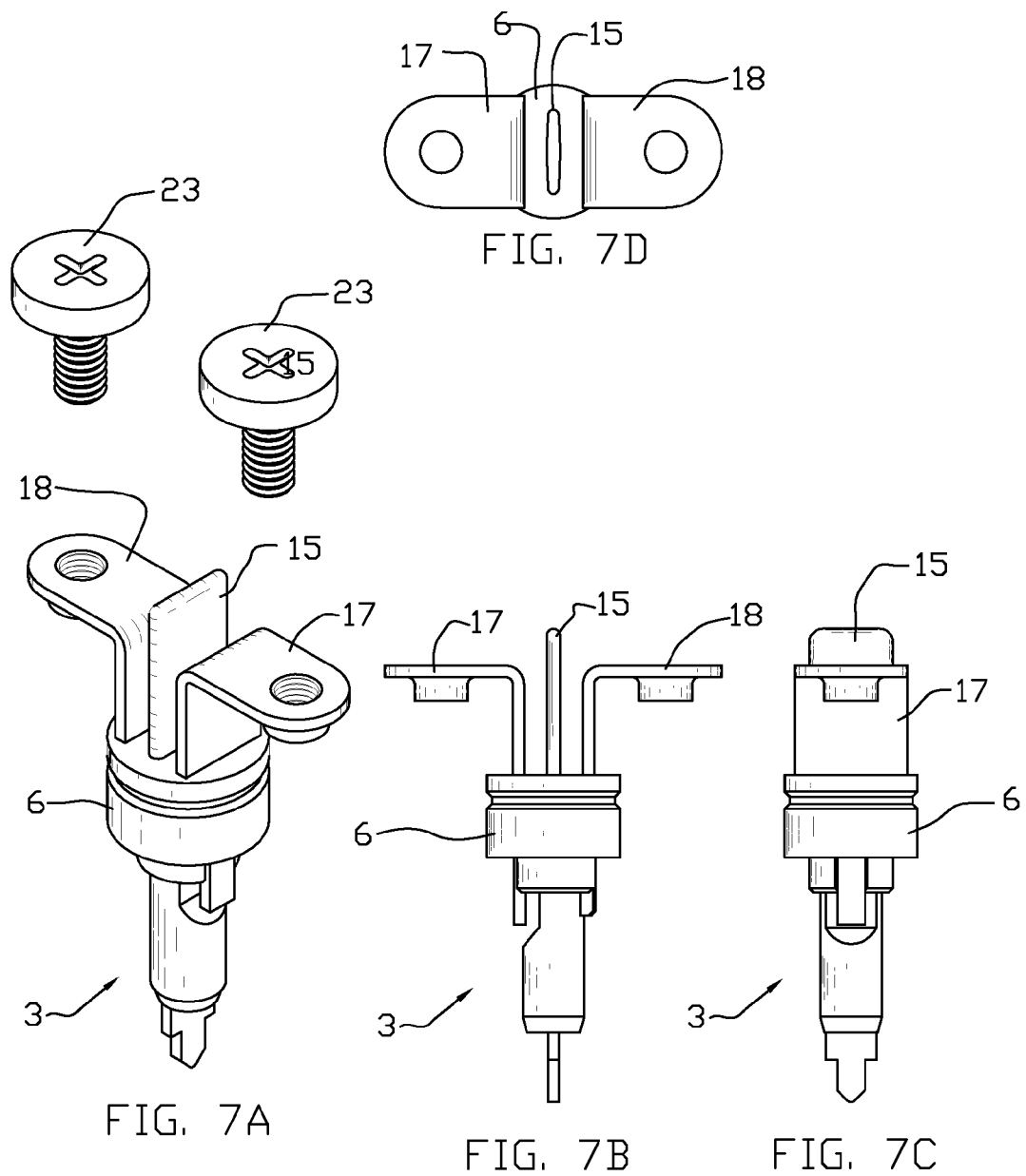

US 8,162,541 B2

TWO-TERMINAL TEMPERATURE SENSOR WITH ELECTRICALLY ISOLATED HOUSING

BACKGROUND

A thermistor is a type of resistor with resistance varying according to its temperature. Temperature sensors utilizing thermistors are widely used to monitor the temperature of various components in an engine. For example, the oil, coolant, and/or engine block temperature may be monitored. In many thermistor-based temperature sensors, one side of the thermistor is connected to a positive terminal that is further connected to a wire leading to a computer. The opposite side of the thermistor is often connected to the temperature sensor casing which in turn is connected to ground. As the surrounding temperature changes, the temperature of the thermistor changes and it's resistance value changes. Using a table of resistance values for reference, the computer may use the resistance value of the temperature sensor to determine the temperature of the thermistor.

In marine applications, such as boats, ships, and yachts, temperature sensors may be occasionally submerged in water or at least regularly come in contact with water. In such cases, there exists a need for a temperature sensor that does not utilize the temperature sensor casing for a return electrical path. Further, the computer may be physically mounted a long distance from the temperature sensor and may not share the same ground as the device being monitored. Additionally, the computer may be especially sensitive to electrical interference and thus must be electrically isolated from the device being monitored. In both cases, there exists a need for a temperature sensor that provides a dedicated return path to the computer for temperature monitoring.

Further, there exists a need for a temperature sensor that is both robust and durable, while being accurate, compact in size, and easy for a consumer to assemble or repair if required.

SUMMARY

A two-terminal temperature sensor utilizing a thermistor or other thermometer device is herein disclosed. A first electrical terminal may be connected to a first end of the thermistor via an inner spring. A second electrical terminal may be connected to a second end of the thermistor via an outer spring and a formed conductor. The inner compression coil and thermistor are positioned within the formed conductor. The inner spring may be prevented from contacting the formed conductor by an inner insulating tube. The first and second electrical contacts may be mounted in a molded terminal assembly that insulates the electrical contacts from one another. The entire aforementioned assembly may be mounted in a housing that is electrically isolated from the formed conductor and outer compression coil via an outer insulating tube and an insulating disk.

The temperature sensor described herein is directed toward reducing the overall size of thermistor-based temperature sensors. According to one aspect of the device, thermal conductivity between the medium and the thermistor is improved, providing more accurate temperature monitoring. According to another aspect of the device, the electrical circuit is simplified reducing the size of the temperature sensor housing. This reduction in size and complexity may reduce manufacturing costs and increase longevity of the temperature sensor. The reduction in complexity may also enable an end user to assemble the temperature sensor at the point of installation rather than the manufacturer at the manufacturing facility. Further, the reduced size may enable a deep well socket to pass over the temperature sensor terminals and insulator for easier installation.

BRIEF DESCRIPTION OF THE DRAWINGS

FIG. 2A is a cross-sectional view of the two-terminal temperature sensor of FIG. 1 as indicated in FIG. 1.

FIG. 2B is a detail sectional view of the lower right-hand corner of FIG. 2A.

FIG. 3A is a multi-sectional view of the two-terminal temperature sensor of FIG. 1.

FIG. 3B is a top plan view of the two-terminal temperature sensor of FIG. 1.

FIG. 7A is an isometric view of a terminal assembly with threaded terminal connectors.

FIG. 7B is a first elevation view of the terminal assembly of FIG. 7A.

FIG. 7C is a second elevation view of the terminal assembly of FIG. 7A.

FIG. 7D is a top plan view of the terminal assembly of FIG. 7A.

DETAILED DESCRIPTION

Figure 1:
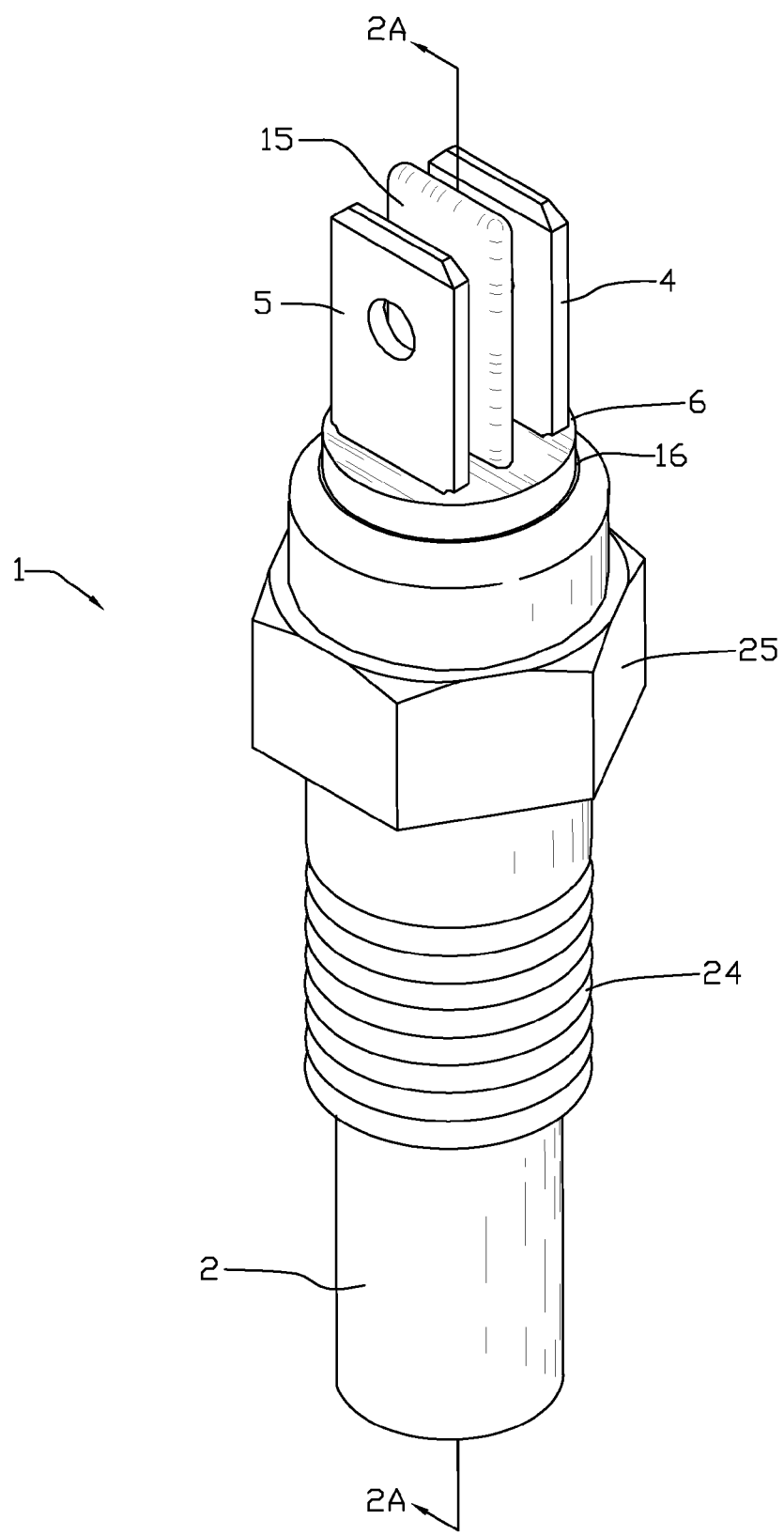
FIG. 1 is an isometric view of a two-terminal temperature sensor.

FIG. 1 is an isometric view of one embodiment of a two-terminal temperature sensor 1. In this embodiment, the housing 2 comprises a cylindrical body with an opening on one end and a threaded exterior 24 for screwing the temperature sensor 1 into a threaded hole in a device to be measured. Further, the housing 1 may be equipped with a hexagonal interface 25 for a wrench or socket. The hexagonal interface 25 may be used to aid in screwing the temperature sensor 1 into the threaded hole and tightening the bottom of the hexagonal interface 25 against the top of the threaded hole thereby securing the temperature sensor 1 to the device to be measured. Other ways of attaching the temperature sensor 1 to the device to be measured are contemplated, for example, welding, soldering, bolting, crimping, and press-fitting.

A terminal insulator 6 may comprise an insulating material with a short terminal 4 and a long terminal 5 protruding therefrom. The short terminal 4 and the long terminal 5 may be utilized as male electrical connectors for wires with female connectors leading to a computer or any other device that may measure the resistance offered by the temperature sensor 1 and determine the temperature of the thermistor based on the resistance measured. Other terminal insulator 6 configurations and electrical connectors are contemplated as discussed in detail with reference to FIGS. 6 and 7. Also protruding from the terminal insulator 6 between the short terminal 4 and the long terminal 5 may be a terminal divider 15. The terminal divider 15 acts as an insulator and ensures that the short terminal 4 and the long terminal 5, or corresponding electrical connectors attached thereto, do not inadvertently come in contact with one another. Further, the terminal divider 15 may be a moulded part of the terminal insulator 6 or it may be separately attached to the terminal insulator 6. As discussed in detail below with reference to FIG. 5, the terminal insulator 6 may be attached to the housing 2 via a crimp 16. Other ways of attaching the terminal insulator 6 to the housing 2 are contemplated, for example, gluing, overmoulding, bolting, screwing, and press-fitting.

FIGS. 2A, 2B, and 3A show cross-sectional views of an embodiment of the temperature sensor 1. The housing 2 may be a substantially cylindrical structure with a closed bottom and an open top. The side walls of the housing 2 may be thinner near the bottom for maximum heat transfer and thicker near the top for added structural strength. Further, the bottom may incorporate a pedestal 26 upon which a thermistor 10 may be mounted. The housing 2 may be equipped with threads 24 on its exterior for attachment to the device to be measured and a hexagonal interface 25 to aid in installing the temperature sensor 1. Further, the top of the housing 2 may be crimped 16 around the terminal insulator 6, described more fully below.

Adjacent to the interior surface of the housing 2 may be an outer insulating tube 13. The outer insulating tube 13 may be a thin, hollow, cylindrical tube with open ends comprised of a material that is not electrically conductive, for example, plastics, ceramics, wood-based products, and paper-based products. The outer insulating tube 13 may be positioned inside the housing 2, with one end resting against the bottom of the housing 2 in an annular well 27 surrounding the pedestal 26. In this manner, the outer insulating tube 13 extends beyond the components it encircles to ensure against electrical contact with the housing 2.

An insulating disk 14 may be positioned inside the outer insulating tube 13 with a bottom face supported by the pedestal 26 at the bottom of the housing 2. The insulating disk 14 may be a thin, circular disk that is composed of a material that is not electrically conductive, but is thermally conductive, for example, a rubberized fabric.

A formed conductor 12 may be positioned inside the outer insulating tube 13 resting against the top of the insulating disk 14. The formed conductor 12 may be a thin, hollow, cylindrical tube with an open top, closed bottom, and openings on each side (see FIG. 4). Alternatively, the formed conductor may have a solid sidewall. Further, the formed conductor 12 is comprised of a material that is electrically conductive. The outer insulating tube 13 serves to prevent the formed conductor 12 from making electrical contact with the housing 2.

Adjacent to the interior surface of the formed conductor 12 may be a inner insulating tube 11. The inner insulating tube 11 may be a thin, hollow, cylindrical tube with open ends comprised of a material that is not electrically conductive, for example, plastics, ceramics, wood-based products, and paper-based products. The inner insulating tube 11 may be positioned inside the formed conductor 12, with one end resting against the bottom of the formed conductor 12.

A thermistor 10 or other thermometer device (e.g., a thermocouple) may be positioned inside the inner insulating tube 11 and rest against the bottom of the formed conductor 12. The thermistor 10 may be formed as a solid cylindrical or disk shape with resistance properties that vary according to temperature.

In another embodiment, the housing 2 may be electrically non-conductive and the temperature sensor 1 may not include an outer insulating tube 13 and/or a insulating disk 14. The housing may serve to prevent the formed conductor 12 and/or thermistor 10 from electrical contact with anything in physical contact with the exterior of the housing 2. The housing 2 may be comprised of, for example, plastics or ceramics.

An electrically conductive inner compression coil 9 may be positioned inside the inner insulating tube 11 and against the top of the thermistor 10. The inner insulating tube 11 extends below the inner compression coil 9 and around the sidewalls of the thermistor 10 and serves to prevent the inner compression coil 9 from electrical contact with the formed conductor 12. An electrically conductive outer compression coil 8 may be positioned against an upper edge or rim of the formed conductor 12 and inside the outer insulating tube 13. The outer insulating tube 13 also serves to prevent the outer compression coil 8 from electrical contact with the housing 2.

The terminal assembly 3 may be comprised of a short terminal 4 and a long terminal 5 that are substantially enveloped in a terminal insulator 6 that is electrically non-conductive. As shown in FIGS. 2A and 3B, the terminal insulator 6 is adapted to keep the short terminal 4 and the long terminal 5 from contacting one another and is adapted to be inserted into the top of the housing 2. An electrically non-conductive washer 7 may be placed between the terminal insulator 6 and the top of the housing 2. This washer 7 may serve to electrically isolate the terminal insulator 6 from the top of the housing 2 as well as seal the interface between the terminal insulator 6 and the top of the housing 2 against moisture and other contaminants. The terminal insulator 6 may be crimped in place.

The long terminal 5 extends from the top of the terminal assembly 3 through the terminal insulator 6 to engage with and partially compress the inner compression coil 9. Thus, the long terminal 5 is electrically connected to the top of the thermistor 10 via the inner compression coil 9. The short terminal 5 extends from the top of the terminal assembly 3 partially through the terminal insulator 6 and against and partially compressing the outer compression coil 8. Thus, the short terminal 5 is electrically connected to the bottom of the thermistor 10 via the outer compression coil 8 and formed conductor 12.

The compression of the inner compression coil 9 presses the thermistor 10 firmly against the bottom of the formed conductor 12 to ensure good electrical contact for completing the circuit. The thermistor 10 is also positioned very close to the bottom of the temperature sensor 1 both in close thermal proximity to the operating environment and having good thermal transfer with the pedestal 26 to provide a very accurate temperature reading.

Figures 4, 5:
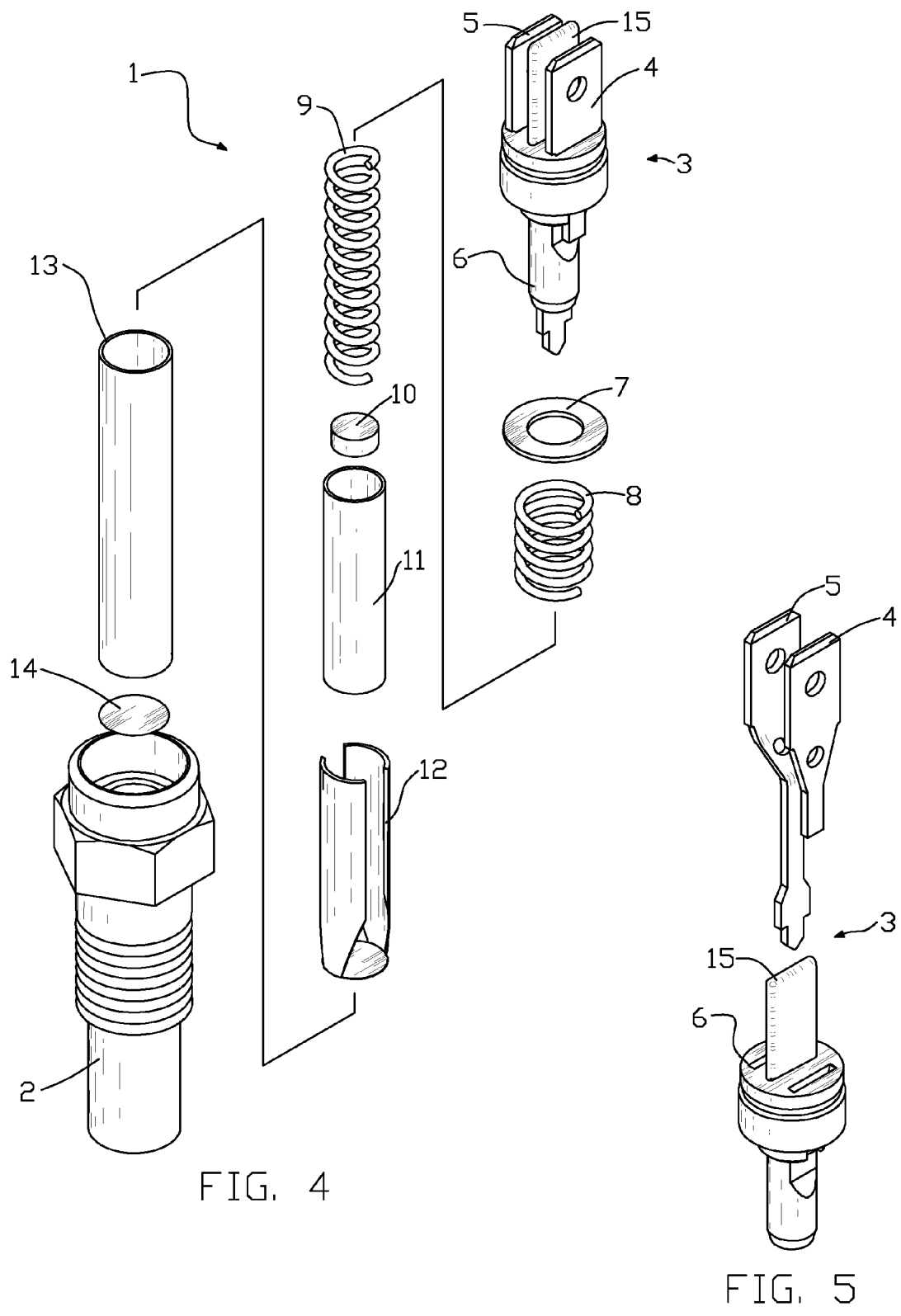
FIG. 4 is an exploded isometric view of the two-terminal temperature sensor of FIG. 1.
FIG. 5 is an exploded isometric view of the terminal insulator and terminals of the two-terminal temperature sensor of FIG. 1.
Figure 6D:
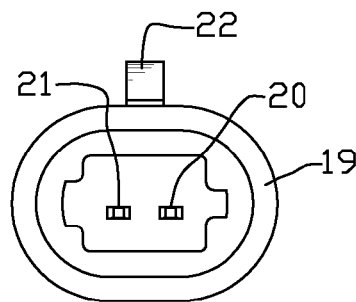
FIG. 6D is a top plan view of the terminal assembly of FIG. 6A.
Figure 6A:
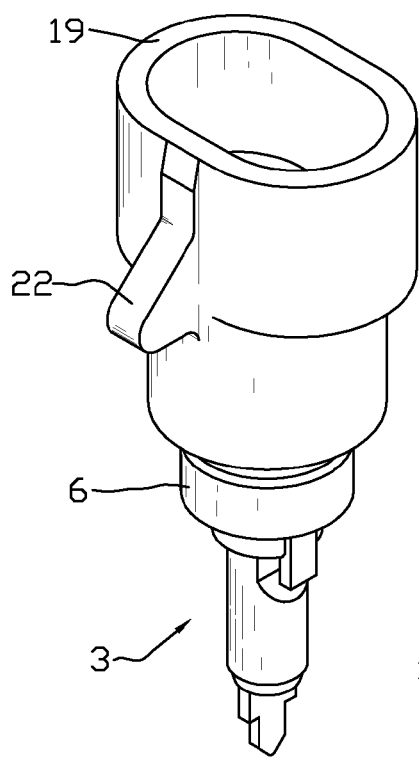
FIG. 6A is an isometric view of a terminal assembly with a Packard type connector.
Figure 6B:
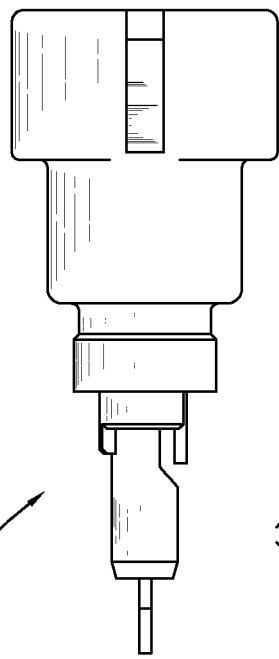
FIG. 6B is a first elevation view of the terminal assembly of FIG. 6A.
Figure 6C:
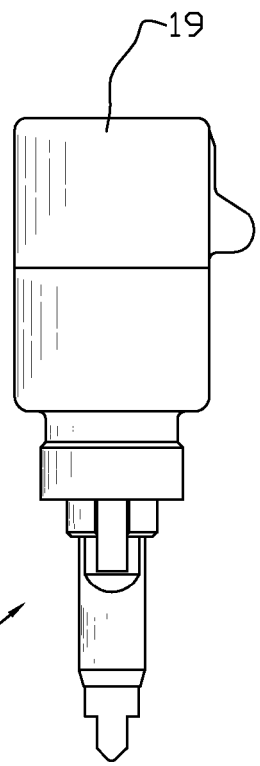
FIG. 6C is a second elevation view of the terminal assembly of FIG. 6A.

FIG. 4 illustrates embodiments of the components of the temperature sensor 1 and how they are assembled. Assembly is made simple so that it may be accomplished by the end user of the two-terminal temperature sensor. The following components may be placed sequentially in the housing 2 through the open top: the insulating disk 14 may be placed against the closed bottom of the housing 2 on the pedestal 26; the outer insulating tube 13 may be situated over the insulating disk 14 and adjacent the closed bottom of the housing 2 around the pedestal 26; the formed conductor 12 may be placed inside the outer insulating tube 13 and adjacent the insulating disk 14; the inner insulating tube 11 may be placed inside and adjacent the bottom of the formed conductor 12; the thermistor 10 may be placed inside the insulating tube 11 and adjacent the bottom of the formed conductor 12; the inner compression coil 9 may be placed inside the insulating tube 11 and adjacent the top of the thermistor 10; the outer compression coil 8 may be placed inside the outer insulating tube 13 and adjacent the top of the formed conductor 12; a washer 7 may be placed inside the housing 2 and adjacent the top of a shoulder inside the housing 2 just above the hexagonal interface 25; and the terminal assembly 3 may be compressed against the washer 7, outer compression coil 8, and inner compression coil 9 while crimping the top rim of the housing 2 against a groove in the outer surface of the terminal assembly 3.

FIG. 5 illustrates embodiments of the components of the terminal assembly 3 and how they are assembled. The terminal assembly 3 may comprise the short terminal 4, long terminal 5, terminal insulator 6, and terminal divider 15. The terminal insulator 6 and terminal divider 15 may be molded together from a non-conductive material. Alternatively, the terminal divider 15 may be formed separately and attached to the terminal insulator 6. The short terminal 4 and long terminal 5 are inserted in apertures running through the terminal insulator 6 on each side of the terminal divider 15. As a result, the short terminal 4 and long terminal 5 protrude from the bottom and the top of the terminal insulator 6. The short terminal 4 and long terminal 5 are secured in place by any available means, for example adhesive, overmoulding of the terminal insulator 6, bolts, screws, or press-fitting.

FIGS. 6A-6D, and 7A-7D illustrate various styles of terminal assemblies for use with various electrical connectors. FIGS. 6A-6D illustrate a terminal assembly 3 with a Packard connector (i.e., a connector typically having a flat blade or in shaped male terminal that is housed within a female protective enclosure for mating with a corresponding female terminal housed within a male protective enclosure designed to fit within and connect to the female protective enclosure). In this embodiment, a molded female connector 19 extends from the terminal insulator 6 and has a short terminal 20 and long terminal 21 molded in the terminal assembly 3. A boss 22 for holding a mating male clip may be molded to the side of molded female connector 19.

FIGS. 7A-7D illustrate a terminal assembly 3 with threaded terminal connectors. In this embodiment, a short threaded terminal 17 and a long threaded terminal 18 provide a screw-type connection and are molded in terminal insulator 6 and isolated from one another by terminal divider 15. Screws 23 thread into the short threaded terminal 17 and long threaded terminal 18 to allow for a crimp-on wire terminal, for example, to be attached. These are just a few examples of possible electrical connectors that may be used in conjunction with the two-terminal temperature sensor. Other electrical connectors are contemplated, for example, various plug and socket connectors and soldered connections.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments or implementations are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A two-terminal temperature sensor comprising
a housing having a sidewall, a closed bottom, and an open top;
an electrically conductive formed conductor housed within and electrically isolated from the housing and having a sidewall, an open top, and a closed bottom;
a thermometer device configured for placement within the formed conductor and in electrical contact with the closed bottom of the formed conductor;
an electrically conductive first terminal positioned within the open top of the housing;
an electrically conductive second terminal positioned within the open top of the housing and configured to be in electrical connection with the open top of the formed conductor; and
an electrically conductive first compression coil placed within and electrically isolated from the formed conductor and positioned between and electrically connecting the first terminal and a top of the thermometer device.

2. The two-terminal temperature sensor of claim 1 further comprising an electrically conductive second compression coil placed within the housing between and electrically connecting the second terminal and the open top of the formed conductor.

3. The two-terminal temperature sensor of claim 1 further comprising
an electrically non-conductive first insulating tube configured for placement between the formed conductor and both the first terminal and the thermometer device; and
an electrically non-conductive second insulating tube configured for placement between the housing and both the second terminal and the formed conductor.

4. The two-terminal temperature sensor of claim 1 further comprising a thin, electrically non-conductive, thermally conductive disk placed between the closed bottom of the housing and the closed bottom of the formed conductor.

5. The two-terminal temperature sensor of claim 1 further comprising
a terminal assembly fixed in the open top of the housing comprising
the first terminal;
the second terminal, wherein each of the first terminal and the second terminal define respective body portions and external protrusion portions; and
an electrically non-conductive terminal insulator, wherein the body portions are enveloped by the terminal insulator and the external protrusion portions protrude from a top end of the terminal insulator.

6. The two-terminal temperature sensor of claim 5 further comprising a terminal divider configured to protrude from the top end of the terminal insulator between the external protrusion portions of each of the first terminal and the second terminal.

7. The two-terminal temperature sensor of claim 5, wherein the terminal insulator defines an annular groove in a sidewall; and the housing is crimped around the annular groove in the terminal insulator.

8. The two-terminal temperature sensor of claim 5 further comprising an electrically non-conductive sealing washer configured to seal an interface between the terminal assembly and the housing from exterior contaminants.

9. The two-terminal temperature sensor of claim 5, wherein the terminal assembly further comprises an electrical connector interfaced with the external protrusion portions of the first terminal and the second terminal.

10. The two-terminal temperature sensor of claim 9, wherein the electrical connector is a Packard connector.

11. The two-terminal temperature sensor of claim 9, wherein the electrical connector is a screw connector.

12. The two-terminal temperature sensor of claim 1, wherein the thermometer device is a thermistor.

13. The two-terminal temperature sensor of claim 1, wherein an exterior surface of the sidewall of the housing is threaded for screwing into an aperture in a device to be measured.

14. The two-terminal temperature sensor of claim 1, wherein the housing is electrically non-conductive and thermally conductive.

15. A two-terminal temperature sensor comprising
a housing having a sidewall, a closed bottom, and an open top;
an electrically conductive formed conductor housed within the housing and having a sidewall, an open top, and a closed bottom;
a thermometer device configured for placement within the formed conductor and in electrical contact with the closed bottom of the formed conductor;
an electrically conductive first terminal positioned within the open top of the housing and configured to be in electrical connection with a top of the thermometer device;
an electrically conductive second terminal positioned within the open top of the housing and configured be in electrical connection with the open top of the formed conductor;
an electrically non-conductive first insulating tube configured for placement between the formed conductor and both the first terminal and the thermometer device; and
an electrically non-conductive second insulating tube configured for placement between the housing and both the second terminal and the formed conductor.

16. The two-terminal temperature sensor of claim 15 further comprising a thin, electrically non-conductive, thermally conductive disk placed between the closed bottom of the housing and the closed bottom of the formed conductor.

17. The two-terminal temperature sensor of claim 15 further comprising
a terminal assembly fixed in the open top of the housing comprising
the first terminal;
the second terminal, wherein each of the first terminal and the second terminal define respective body portions and external protrusion portions;
an electrically non-conductive terminal insulator, wherein the body portions are enveloped by the terminal insulator and the external protrusion portions protrude from a top end of the terminal insulator.

18. The two-terminal temperature sensor of claim 17 further comprising a terminal divider configured to protrude from a top end of the terminal insulator between a first terminal protrusion of the first terminal and a second terminal protrusion of the second terminal.

19. A two-terminal temperature sensor comprising
a housing having a sidewall, a closed bottom, and an open top;
a terminal assembly fixed within the open top of the housing comprising
an electrically conductive first terminal;
an electrically conductive second terminal, wherein each of the first terminal and the second terminal define respective body portions, external protrusion portions, and internal contact portions; and
an electrically non-conductive terminal insulator, wherein
the body portions are enveloped by the terminal insulator, the external protrusion portions protrude from a top end of the terminal insulator, and the internal contact portions protrude from a bottom end of the terminal insulator within the housing;
an electrically conductive formed conductor housed within the housing and having a sidewall, an open top, and a closed bottom;
a thermistor configured for placement within the formed conductor and in electrical contact with the closed bottom of the formed conductor;
a thin, electrically non-conductive, thermally conductive disk placed between the closed bottom of the housing and the closed bottom of the formed conductor;
an electrically conductive first compression coil placed within the formed conductor and positioned between and electrically connecting the internal contact portion of the first terminal and a top of the thermistor;
an electrically non-conductive first insulating tube surrounding the first compression coil and interposed between the formed conductor and both the first compression coil and the thermistor;
an electrically conductive second compression coil placed within the housing between and electrically connecting the open top of the formed conductor and the internal contact portion of the second terminal; and
an electrically non-conductive second insulating tube surrounding the second compression coil and the formed conductor and interposed between the housing and both the second compression coil and the formed conductor.

20. The two-terminal temperature sensor of claim 19, wherein
the terminal insulator defines an annular groove in a sidewall; and
the housing is crimped around the annular groove in the terminal insulator.

* * * * *